(12) United States Patent
Kanukurthy et al.

(10) Patent No.: US 12,148,280 B2
(45) Date of Patent: *Nov. 19, 2024

(54) CONTEXT-BASED PROGRAMMABLE SAFETY RULES FOR PERSONAL PROTECTIVE EQUIPMENT

(71) Applicant: 3M INNOVATIVE PROPERTIES COMPANY, St. Paul, MN (US)

(72) Inventors: Kiran S. Kanukurthy, Woodbury, MN (US); Steven T. Awiszus, Woodbury, MN (US); Eric C. Lobner, Woodbury, MN (US); MIchael G. Wurm, Waukesha, WI (US); Kenneth J. Gamberini, North Prairie, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,868

(22) Filed: May 1, 2023

(65) Prior Publication Data
US 2023/0267817 A1 Aug. 24, 2023

Related U.S. Application Data

(63) Continuation of application No. 17/242,966, filed on Apr. 28, 2021, now Pat. No. 11,676,468, which is a (Continued)

(51) Int. Cl.
*G08B 21/02* (2006.01)
*A41D 13/002* (2006.01)
(Continued)

(52) U.S. Cl.
CPC ....... *G08B 21/0275* (2013.01); *A41D 13/002* (2013.01); *A62B 9/006* (2013.01);
(Continued)

(58) Field of Classification Search
None
See application file for complete search history.

(56) References Cited

U.S. PATENT DOCUMENTS 6,853,303 B2 2/2005 Chen et al.
7,711,822 B1 5/2010 Duvur et al.
(Continued)

FOREIGN PATENT DOCUMENTS

KR 20130138422 A 12/2013
KR 20160006350 A 1/2016
(Continued)

OTHER PUBLICATIONS

International Search Report for PCT International Application No. PCT/US2017/056392, mailed on Mar. 29, 2019, 4 pages.

*Primary Examiner* — Fekadeselassie Girma

(57) ABSTRACT

In some examples, a system includes: an article of personal protective equipment (PPE) that includes a communication component; a computing device communicatively coupled to the article of PPE, wherein the computing device: receives context data that is based on one or more of the article of PPE, a work environment for the article of PPE, or a worker assigned to the article of PPE; selects, based at least in part on the context data, a set of programmable safety rules that are contextually associated with the at least one article of PPE; sends the programmable safety rules to one or more of the article of PPE or a data hub communicatively coupled to the article of PPE; and wherein the programmable safety rules are configured at the article of PPE or the data hub to perform one or more operations based at least in part on PPE data.

19 Claims, 6 Drawing Sheets

Related U.S. Application Data continuation of application No. 16/739,329, filed on Jan. 10, 2020, now Pat. No. 11,030,873, which is a continuation of application No. 15/782,676, filed on Oct. 12, 2017, now Pat. No. 10,607,467.

(60) Provisional application No. 62/408,386, filed on Oct. 14, 2016.

(51) Int. Cl.
| | |
|---|---|
| *A62B 9/00* | (2006.01) |
| *A62B 18/08* | (2006.01) |
| *G06Q 10/0635* | (2023.01) |
| *G06Q 10/0639* | (2023.01) |
| *G06Q 50/26* | (2024.01) |
| *G08B 7/06* | (2006.01) |
| *G08B 21/12* | (2006.01) |

(52) U.S. Cl.
CPC .......... *A62B 18/08* (2013.01); *G06Q 10/0635* (2013.01); *G06Q 10/0639* (2013.01); *G06Q 50/265* (2013.01); *G08B 7/06* (2013.01); *G08B 21/02* (2013.01); *G08B 21/12* (2013.01)

(56) References Cited

U.S. PATENT DOCUMENTS

| | | | | |
|---|---|---|---|---|
| 7,764,191 | B2* | 7/2010 | Hall | G05B 19/4183 700/95 |
| 8,025,227 | B2* | 9/2011 | Hall | G06F 16/27 235/385 |
| 9,143,843 | B2* | 9/2015 | De Luca | H04Q 9/02 |
| 10,607,467 | B2* | 3/2020 | Kanukurthy | G08B 21/0275 |
| 11,030,873 | B2* | 6/2021 | Kanukurthy | A41D 13/002 |
| 2002/0091991 | A1* | 7/2002 | Castro | G06F 9/06 717/106 |
| 2008/0129825 | A1* | 6/2008 | DeAngelis | H04N 23/661 348/E7.086 |
| 2009/0058600 | A1* | 3/2009 | Krepel | G07C 11/00 340/10.1 |
| 2009/0161918 | A1* | 6/2009 | Heller | G07C 9/00904 382/115 |
| 2010/0216064 | A1* | 8/2010 | Takimoto | G03F 1/70 430/30 |
| 2010/0295660 | A1* | 11/2010 | Farioli Brioschi | G06Q 10/087 340/10.1 |
| 2011/0087559 | A1* | 4/2011 | Paul | H04N 7/18 709/224 |
| 2011/0227700 | A1* | 9/2011 | Hamerly | A62B 9/006 340/10.1 |
| 2011/0234374 | A1* | 9/2011 | Insley | A61B 42/30 340/10.1 |
| 2012/0146789 | A1 | 6/2012 | De Luca et al. | |
| 2013/0024170 | A1 | 1/2013 | Dannecker et al. | |
| 2013/0073344 | A1* | 3/2013 | Parent | G06Q 10/04 705/7.39 |
| 2013/0262656 | A1* | 10/2013 | Cao | H04L 41/142 709/224 |
| 2013/0275582 | A1* | 10/2013 | Gedam | H04L 41/0213 709/224 |
| 2014/0304402 | A1* | 10/2014 | Prakash | H04L 43/08 709/224 |
| 2016/0052762 | A1* | 2/2016 | Swift | B60Q 9/008 340/425.5 |
| 2016/0155279 | A1* | 6/2016 | Thomas | G07C 9/25 340/5.52 |
| 2016/0380860 | A1* | 12/2016 | Singhal | H04L 43/0864 709/224 |
| 2017/0169533 | A1* | 6/2017 | O'Brien | G06Q 50/265 |
| 2017/0206534 | A1* | 7/2017 | O'Brien | A41D 1/002 |
| 2017/0225032 | A1* | 8/2017 | Jones | A41D 1/002 |
| 2017/0303187 | A1* | 10/2017 | Crouthamel | G06K 7/10297 |
| 2017/0339741 | A1* | 11/2017 | K | H04L 67/52 |
| 2018/0211345 | A1* | 7/2018 | Bean | G01S 11/06 |
| 2018/0289095 | A1* | 10/2018 | Catterson | A42B 3/0453 |
| 2021/0264761 | A1* | 8/2021 | Kanukurthy | A62B 18/08 |

FOREIGN PATENT DOCUMENTS

| | | |
|---|---|---|
| RU | 162541 U1 | 6/2016 |
| WO | 2009029347 A1 | 3/2009 |
| WO | 2013107914 A1 | 7/2013 |
| WO | 2016111970 A1 | 7/2016 |
| WO | 2016118690 A1 | 7/2016 |
| WO | 2019088962 A1 | 5/2019 |

* cited by examiner

CONTEXT-BASED PROGRAMMABLE SAFETY RULES FOR PERSONAL PROTECTIVE EQUIPMENT

TECHNICAL FIELD

This disclosure relates to safety equipment and, in particular, using safety equipment in different work environments.

BACKGROUND

Maintaining the safety and health of workers is a major concern across many industries. Various rules and regulations have been developed to aid in addressing this concern. Such rules provide sets of requirements to ensure proper administration of personnel health and safety procedures. To help in maintaining worker safety and health, some individuals may be required to don, wear, carry, or otherwise use a personal protective equipment (PPE) article, if the individuals enter or remain in work environments that have hazardous or potentially hazardous conditions.

Known types of PPE articles include, without limitation, respiratory protection equipment (RPE), e.g., for normal condition use or emergency response; protective eyewear, such as visors, goggles, filters or shields; protective headwear, such as hard hats, hoods or helmets; hearing protection devices; protective shoes; protective gloves; other protective clothing, such as coveralls and aprons; protective articles, such as sensors, safety tools, detectors, global positioning devices, mining cap lamps and any other suitable gear. In some instances, a worker may operate in multiple different work environments over the course of a particular time interval (e.g., day, week, etc.).

SUMMARY

In general, this disclosure describes techniques and components for dynamically configuring programmable safety rules for one or more articles of PPE based on detected contextual data that corresponds to one or more of a work environment, worker, and/or PPE. For instance, due to safety requirements, a worker operating in a particular work environment may require specific PPE, or may need to operate in the work environment with the PPE in accordance with the safety requirements. Because a worker may move between multiple work environments in a particular time interval (e.g., a single day), a worker may violate safety requirements for any number of reasons (fatigue, forgetfulness, unawareness of environment change, etc.). As such, a violation of a safety requirement may lead to harm to the worker and/or improper functioning of PPE to name only a few examples. Techniques and components of this disclosure provide for dynamic selection and configuration of programmable safety rules based on context data, which may be configured at PPE of the worker or a data hub that is in communication with the PPE. Accordingly, as the worker moves from one work environment to another, or as a particular work environment itself dynamically changes, the context data corresponding to the different or changing work environment may cause different programmable to safety rules to be configured at the PPE or a data hub that is in communication with the PPE. In this way, the dynamically configured safety rules based on context data can be applied to worker behavior, PPE data, and work environment data for the safety requirements that are applicable for the given context data. Such programmable safety rules may generate contextually relevant alerts, alter PPE behavior or perform any other suitable actions based on whether conditions for such programmable safety rules are or are not satisfied.

In some examples, a system includes: an article of personal protective equipment (PPE) that includes a communication component; a computing device communicatively coupled to the article of PPE, wherein the computing device: receives context data that is based at least in part on one or more of the article of PPE, a work environment for the article of PPE, or a worker assigned to the article of PPE; selects, based at least in part on the context data, a set of programmable safety rules that are contextually associated with the at least one article of PPE; sends the programmable safety rules to one or more of the article of PPE or a data hub communicatively coupled to the article of PPE; and wherein the programmable safety rules are configured at the article of PPE or the data hub to perform one or more operations based at least in part on PPE data received from the communication component of the article of PPE.

In some examples, a computing device includes one or more computer processors; and a memory comprising instructions that when executed by the one or more computer processors cause the one or more computer processors to: receives context data that is based at least in part on one or more of an article of PPE, a work environment for the article of PPE, or a worker assigned to the article of PPE; selects, based at least in part on the context data, a set of programmable safety rules that are contextually associated with the at least one article of PPE; sends the programmable safety rules to one or more of the article of PPE or a data hub communicatively coupled to the article of PPE; and wherein the programmable safety rules are configured at the article of PPE or the data hub to perform one or more operations based at least in part on PPE data received from the communication component of the article of PPE.

In some examples, a method includes receiving, by a computing device, context data that is based at least in part on one or more of an article of PPE, a work environment for the article of PPE, or a worker assigned to the article of PPE; selecting, based at least in part on the context data, a set of programmable safety rules that are contextually associated with the at least one article of PPE; and sending the programmable safety rules to one or more of the article of PPE or a data hub communicatively coupled to the article of PPE, wherein the programmable safety rules are configured at the article of PPE or the data hub to perform one or more operations based at least in part on PPE data received from the communication component of the article of PPE.

In some examples, a method includes determining, by a computing device, context data that is based at least in part on one or more of an article of PPE, a work environment for the article of PPE, or a worker assigned to the article of PPE; selecting, based at least in part on the context data, a set of programmable safety rules that are contextually associated with the at least one article of PPE; configuring, by the computing device, the set of programmable safety rules to perform one or more operations based at least in part on PPE data received from the communication component of the article of PPE; and in response to receiving the PPE data of the article of PPE and determining that at least one of the set of programmable safety rules has been satisfied, performing the one or more operations based at least in part on PPE data received from the communication component of the article of PPE.

The details of one or more examples are set forth in the accompanying drawings and the description below. Other

DETAILED DESCRIPTION

Figure 1:
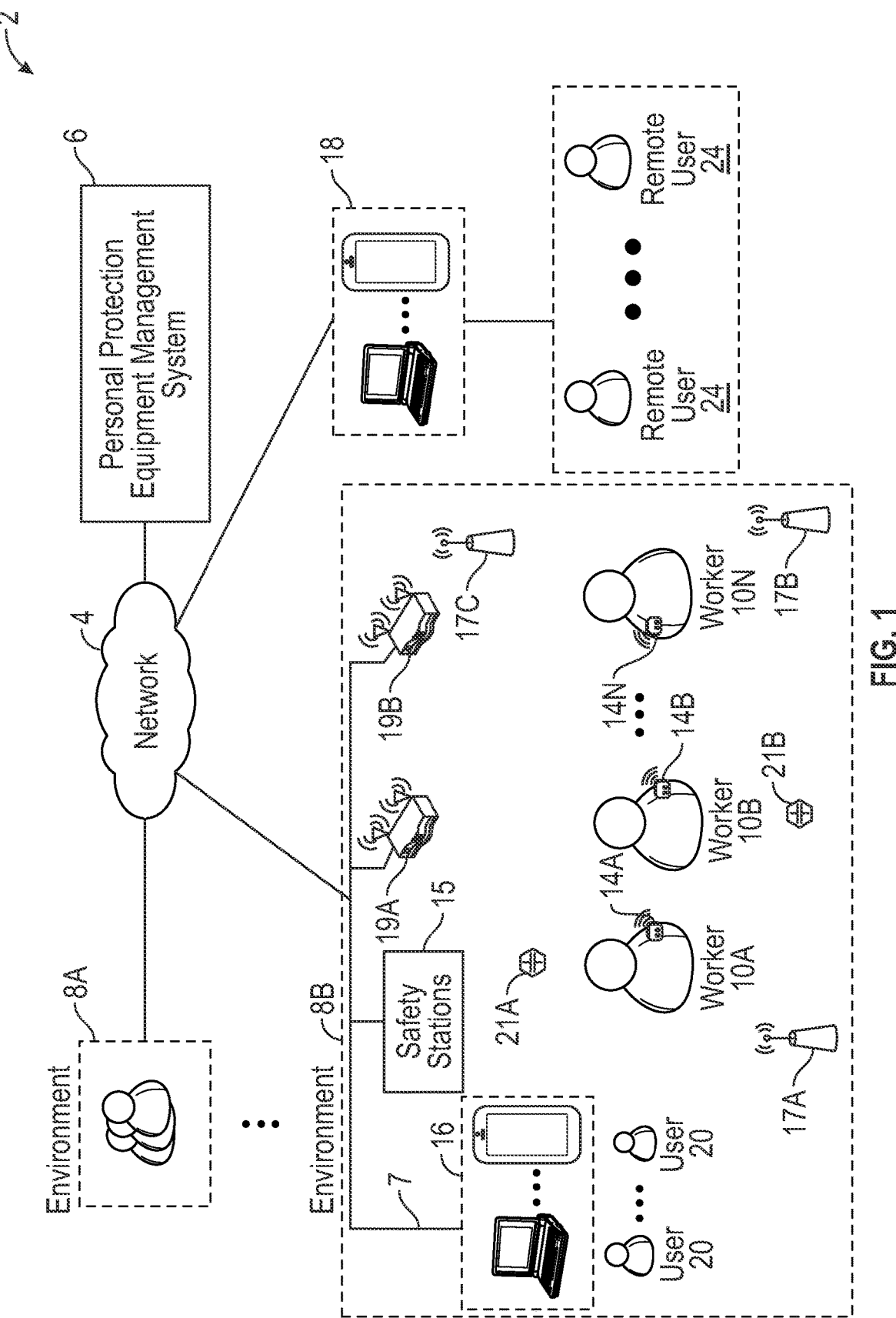
FIG. 1 is a block diagram illustrating an example computing system in which a personal protection equipment management system (PPEMS) manages personal protection equipment, in accordance with techniques of this disclosure.

FIG. 1 is a block diagram illustrating an example computing system 2 that includes a personal protection equipment management system (PPEMS) 6 for managing personal protection equipment. As described herein, PPEMS allows authorized users to perform preventive occupational health and safety actions and manage inspections and maintenance of safety protective equipment. By interacting with PPEMS 6, safety professionals can, for example, manage area inspections, worker inspections, worker health and safety compliance training.

In general, PPEMS 6 provides data acquisition, monitoring, activity logging, reporting, predictive analytics, PPE control, and alert generation to name only a few examples. For example, PPEMS 6 includes an underlying analytics and safety event prediction engine and alerting system in accordance with various examples described herein. As further described below, PPEMS 6 provides an integrated suite of personal safety protection equipment management tools and implements various techniques of this disclosure. That is, PPEMS 6 provides an integrated, end-to-end system for managing personal protection equipment, e.g., safety equipment, used by workers 10 within one or more physical environments 8, which may be construction sites, mining or manufacturing sites or any physical environment. The techniques of this disclosure may be realized within various parts of computing environment 2.

As shown in the example of FIG. 1, system 2 represents a computing environment in which a computing device within of a plurality of physical environments 8A, 8B (collectively, environments 8) electronically communicate with PPEMS 6 via one or more computer networks 4. Each of physical environment 8 represents a physical environment, such as a work environment, in which one or more individuals, such as workers 10, utilize personal protection equipment while engaging in tasks or activities within the respective environment.

In this example, environment 8A is shown as generally as having workers 10, while environment 8B is shown in expanded form to provide a more detailed example. In the example of FIG. 1, a plurality of workers 10A-10N may be wearing a variety of different PPE, such as ear muff hearing protectors and a powered-air purifying respirator (PAPR) (further illustrated in FIG. 4).

As further described herein, each of article of PPE may include one or more of embedded sensors, communication components, monitoring devices and processing electronics configured to capture PPE data that corresponds to the PPE in real-time as a user (e.g., worker) engages in activities while wearing the PPE. For example, as described in greater detail with respect to the example shown in FIG. 4, a PAPR may include a variety of electronic sensors for measuring operations of the PAPR, such as but not limited to: filter type, filter life, air flow rate, and the like. In addition, each article of PPE may include one or more output devices for outputting data that is indicative of operation of the PPE and/or generating and outputting communications to the respective worker 10. For example, articles PPE 11 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

In some examples, each of environments 8 include computing facilities (e.g., a local area network) by which articles of PPE assigned to workers 10 are able to communicate with PPEMS 6. For examples, environments 8 may be configured with wireless technology, such as 802.11 wireless networks, 802.15 ZigBee networks, and the like. In the example of FIG. 1, environment 8B includes a local network 7 that provides a packet-based transport medium for communicating with PPEMS 6 via network 4. In addition, environment 8B includes a plurality of wireless access points 19A, 19B that may be geographically distributed throughout the environment to provide support for wireless communications throughout the work environment.

One or more articles of PPE may be configured to communicate data, such as sensed motions, events and conditions, via wireless communications, such as via 802.11 WiFi protocols, Bluetooth protocol or the like. The articles of PPE may, for example, communicate directly with a wireless access point 19. As another example, one or more of workers 10 may be equipped with a respective one of wearable data hubs 14A-14M that enable and facilitate communication between articles of PPE and PPEMS 6. For examples, articles of PPE for a respective worker may communicate with a respective data hub 14 via Bluetooth or other short range protocol, and the data hubs may communicate with PPEMs 6 via wireless communications processed by wireless access points 19. Although shown as wearable devices, hubs 14 may be implemented as stand-alone devices deployed within environment 8B. In some examples, a hub may be an article of PPE.

In general, each of hubs 14 operates as a wireless device for articles of PPE relaying communications to and from the PPE, and may be capable of buffering usage data in case communication is lost with PPEMS 6. Moreover, each of hubs 14 is programmable via PPEMS 6 so that local alert rules may be installed and executed without requiring a connection to the cloud. As such, each of hubs 14 provides a relay of streams of usage data from articles of PPE within the respective environment, and provides a local computing environment for localized alerting based on streams of events in the event communication with PPEMS 6 is lost.

As shown in the example of FIG. 1, an environment, such as environment 8B, may also include one or more wireless-enabled beacons, such as beacons 17A-17C, that provide accurate location information within the work environment. For example, beacons 17A-17C may be GPS-enabled such that a controller within the respective beacon may be able to precisely determine the position of the respective beacon. Alternatively, beacons 17A-17C may include a pre-programmed identifier that is associated in PPEMS 6 with a particular location. Based on wireless communications with one or more of beacons 17, a given SLR 11 or data hub 14 worn by a worker 10 is configured to determine the location of the worker within work environment 8B. In this way, event data reported to PPEMS 6 may be stamped with positional information to aid analysis, reporting and analytics performed by the PPEMS.

In addition, an environment, such as environment 8B, may also include one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to PPEMS 6. As such, PPEMS 6 may configured to correlate the senses environmental conditions with the particular regions and, therefore, may utilize the captured environmental data when processing event data received from articles of PPE. For example, PPEMS 6 may utilize the environmental data to aid generating alerts or other instructions for articles of PPE and for performing predictive analytics, such as determining any correlations between certain environmental conditions (e.g., heat, humidity, visibility) with abnormal worker behavior or increased safety events. As such, PPEMS 6 may utilize current environmental conditions to aid prediction and avoidance of imminent safety events. Example environmental conditions that may be sensed by sensing devices 21 include but are not limited to temperature, humidity, presence of gas, pressure, visibility, wind and the like.

In example implementations, an environment, such as environment 8B, may also include one or more safety stations 15 distributed throughout the environment to provide viewing stations for accessing PPEMs 6. Safety stations 15 may allow one of workers 10 to check out articles of PPE and/or other safety equipment, verify that safety equipment is appropriate for a particular one of environments 8, and/or exchange data. For example, safety stations 15 may transmit alert rules, software updates, or firmware updates to articles of PPE or other equipment. Safety stations 15 may also receive data cached on articles of PPE, hubs 14, and/or other safety equipment. That is, while articles of PPE (and/or data hubs 14) may typically transmit usage data from sensors of articles of PPE to network 4, in some instances, articles of PPE (and/or data hubs 14) may not have connectivity to network 4. In such instances, articles of PPE (and/or data hubs 14) may store usage data locally and transmit the usage data to safety stations 15 upon being in proximity with safety stations 15. Safety stations 15 may then upload the data from articles of PPE and connect to network 4.

In addition, each of environments 8 include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Each of environments 8 may include systems. Similarly, remote users may use computing devices 18 to interact with PPEMS via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safely equipment utilized by workers 10, such as accessing and viewing usage records, analytics and reporting. For example, users 20, 24 may review usage information acquired and stored by PPEMS 6, where the usage information may include data specifying starting and ending times over a time duration (e.g., a day, a week, or the like), data collected during particular events, such as detected falls, sensed data acquired from the user, environment data, and the like. In addition, users 20, 24 may interact with PPEMS 6 to perform asset tracking and to schedule maintenance events for individual pieces of safety equipment, e.g., SRLs 11, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

Further, as described herein, PPEMS 6 integrates an event processing platform configured to process thousand or even millions of concurrent streams of events from digitally enabled PPEs. An underlying analytics engine of PPEMS 6 applies historical data and models to the inbound streams to compute assertions, such as identified anomalies or predicted occurrences of safety events based on conditions or behavior patterns of workers 10. Further, PPEMS 6 provides real-time alerting and reporting to notify workers 10 and/or users 20, 24 of any predicted events, anomalies, trends, and the like.

The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 tightly integrates comprehensive tools for managing personal protection equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, PPEMS 6 may provide a database query engine for directly querying PPEMS 6 to view acquired safety information, compliance information and any results of the analytic engine, e.g., by the way of dashboards, alert notifications, reports and the like. That is, users 24, 26, or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 2 for which unusually anomalous (e.g., high) safety events have been or are predicted to occur, identifications of any of environments 2 exhibiting anomalous occurrences of safety events relative to other environments, and the like.

As illustrated in detail below, PPEMS 6 may simplify workflows for individuals charged with monitoring and ensure safety compliance for an entity or environment. That is, the techniques of this disclosure may enable active safety management and allow an organization to take preventative or correction actions with respect to certain regions within environments 8, particular pieces of safety equipment 11 or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of SRLs 11. In this manner, PPEMS 6 may identify individual pieces of SRLs 11 or workers 10 for which the metrics do not meet the benchmarks and prompt the users to intervene and/or perform procedures to improve the metrics relative to the benchmarks, thereby ensuring compliance and actively managing safety for workers 10.

In some instances, a worker may operate in multiple, different work environments in a single workday or other work interval (e.g., hour/week/month/year interval, project interval, and the like). Each work environment may have different safety requirements. A work environment may have different safety requirements as a result of different characteristics of the work environment. Characteristics of the work environment may include hazards (e.g., contaminants, low-lighting, uneven surfaces, voids, etc.), physical conditions (noise, heat, confined location, etc.), work environment operating times, or any other characteristic. As an example, worker 10A may be equipped with PPE, such as a power-air purifying respirator (PAPR) to filter contaminants from the air in work environments 8A and 8B. Work environment 8A may include contaminants that require a particulate filter in the PAPR, while work environment 8B may include contaminants that require both an organic vapor filter and a particulate filter in the PAPR.

In a single work day, worker 10A may work in both environment 8A and 8B. If worker 10A moves from work environment 8A to 8B without adding an organic vapor filter to the PAPR, worker 10A may be exposed to harmful organic vapor filters as a result. Worker 10A may not add the organic vapor filter when moving between work environments for a variety of reasons. For instance, worker 10A not be aware of the differing characteristics of work environment 8A and 8B, worker 10A may forget that characteristics of work environment 8A and 8B differ, worker 10A may be distracted or fatigued, or worker 10A may not be aware that he or she has moved from one work environment to another, to name only a few examples.

Techniques and components of this disclosure may improve the operation and effectiveness of PPE worn by workers and/or improve the safety of such workers when operating in different work environments over a particular work interval. For instance, one or more of a data hub associated with a worker and/or PPE associated with a worker may be configured with one or more programmable safety rules. In some examples, a safety rule may be represented as data that defines a condition and an action that is assigned, mapped, or otherwise corresponds to the condition. A condition may be a testable state or condition that is satisfiable by one or more values. For instance, a condition may be a Boolean condition (true/false), comparative condition (greater than, equal to, or less than), or any other condition. As an example, a condition may determine whether a current location of a data hub is equal to work environment 8A or 8B. Another example condition may determine whether a particulate level satisfies a threshold (e.g., is greater than, equal to, or less than the threshold). An action that corresponds to a condition may be a set of one or more operations that are executable by a processor when the condition is satisfied or is not satisfied. For instance, an action may include generating an alert at a data hub and sending a message to PPEMS 6. Techniques and components of this disclosure are further described with respect to FIG. 1

As shown in FIG. 1, worker 10A may operate between work environment 8A and 8B in a single day. As described above, work environment 8A may include contaminants that require a particulate filter in a PAPR worn by worker 10A, while work environment 8B may include contaminants that require both an organic vapor filter and a particulate filter in the PAPR. Remote user 24 may be a safety manager for work environments 8A and 8B. As such, remote user 24 may provide one or more user inputs at computing device 18 that configure a set of safety rules for work environment 8A and 8B. For instance, PPEMS may provide a safety rule builder user interface in which the safety manager may select from a pre-existing set of safety rules and/or define safety rules that are associated with different context data. In some examples, a safety rule set may correspond to a particular role or profile that one or more or workers may be assigned to. As such, a safety rule set may be sent or otherwise assigned to more than one worker, each of whom are assigned to a particular role or profile.

In FIG. 1, remote user 24 may define a first safety rule with a condition that determines if a worker is approaching or has entered work environment 8A, (a) whether a PAPR is being worn by the worker and (b) whether the filter in the PAPR of a particular type of filter, e.g., a filter that removes contaminants of a particular type. The user input may specify an action associated with the filter if a worker is in environment 8A and does not have the particular type of filter installed in the PAPR used by the worker. The first safety rule may specify actions such as generating an alert at data hub 14A associated with worker 10A and sending a message to PPEMS 6, which may cause PPEMS 6 to send a notification to remote user 24 (e.g., the safety manager). In some examples, proximate and/or approaching may mean within a pre-defined distance, or within a range of wireless communication.

Remote user 24 may define a second safety rule with a condition that determines if a worker is approaching or has entered work environment 8B, (a) whether a PAPR is being worn by the worker and (b) whether the PAPR includes two filters to remove particulates and organic vapors, respectively. The user input may specify an action associated with the filter if a worker is approaching or has entered work environment 8B and does not have both filters installed in the PAPR used by the worker. The second safety rule may specify actions such as generating an alert at data hub 14A associated with worker 10A, sending a message to remote user 24 via PPEMS 6, and sending a message to an access control device which bars entry to environment 8B.

Initially, worker 10A be assigned, equipped, and/or wear one or more articles of PPE. For instance, worker 10A may don a PAPR and data hub 14A (as further illustrated in FIG. 4). The PAPR may include a filter to remove particulates but not organic vapors. Data hub 14A may be initially configured with and store a unique identifier of worker 10A. PPEMS 6 may store a mapping between the unique identifier of worker 10A and a unique device identifier of data hub 14A. Worker 10A may initially put on the PAPR and data hub 14A prior to entering environment 8A. As worker 10A approaches environment 8A and/or has entered environment 8A, data hub 14A may determine that worker 10A is within a threshold distance of entering environment 8A or has entered environment 8A. Data hub 14A may perform this determination using Global Positioning System (GPS), one or more location beacons placed within or near environment 8A, by wireless communicating with a safety station position at environment 8A (e.g., within or a threshold distance from environment 8A), by detecting one or more devices (e.g., data hubs, PPE, etc.) of other workers within or a threshold distance from environment 8A, or any other suitable technique for determining that worker 10A is within a threshold distance of entering environment 8A or has entered environment 8A.

In some examples, data hub 14A may be pre-loaded with the first safety rule (and one or more other safety rules for work environment 8A) prior to worker 10A approaching environment 8A and/or entering environment 8A. In another example, data hub 14A may determine that it is within a threshold distance of entering environment 8A or has entered environment 8A and send a message that includes context data to PPEMS 6 that indicates data hub 14A is within a threshold distance of entering environment 8A. Alternatively, another computing device (e.g., a safety station, beacon, data hub, or any other computing device) in proximity to data hub 14A may determine that data hub 14A is within a threshold distance of entering environment 8A or has entered environment 8A and send a message that includes context data to PPEMS 6 that indicates data hub 14A is within a threshold distance of entering environment 8A. In any case, PPEMS 6 may determine that data hub 14A is within a threshold distance of entering environment 8A or has entered environment 8A based on context data received at PPEMS 6.

Context data, in some examples, may refer to any data describing or characterizing the properties or operation of a worker, worker environment, article of PPE, or any other entity. Context data of a worker may include, but is not limited to: a unique identifier of a worker, type of worker, role of worker, physiological or biometric properties of a worker, experience of a worker, training of a worker, time worked by a worker over a particular time interval, location of the worker, or any other data that describes or characterizes a worker. Context data of an article of PPE may include, but is not limited to: a unique identifier of the article of PPE; a type of PPE of the article of PPE; a usage time of the article of PPE over a particular time interval; a lifetime of the PPE; a component included within the article of PPE; a usage history across multiple users of the article of PPE; contaminants, hazards, or other physical conditions detected by the PPE, expiration date of the article of PPE; operating metrics of the article of PPE. Context data for an work environment may include, but is not limited to: a location of a work environment, a boundary or perimeter of a work environment, an area of a work environment, hazards within a work environment, physical conditions of a work environment, permits for a work environment, equipment within a work environment, owner of a work environment, responsible supervisor and/or safety manager for a work environment.

PPEMS 6 may receive the context data and select, based at least in part on the context data, a set of programmable safety rules that are contextually associated with at least one article of PPE worn by or assigned to worker 10A. For instance, PPEMS 6 may receive context data for worker 10A that indicates a unique identifier of worker 10A, a set of identifiers of articles of PPE worn by worker 10A, and an indication of work environment 8A. In some examples, context data for the work environment 8A may include a unique identifier of work environment 8A, while in other examples, context data may include a set of one or more characteristics of the work environment that PPEMS 6 may use to select one or more safety rules that correspond to or match the one or more characteristics of the work environment. Based on the context data, PPEMS 6 may select the first safety rule associated with work environment 8A and described above with a condition that determines if a worker is approaching or has entered work environment 8A, (a) whether a PAPR is being worn by the worker and (b) whether the filter in the PAPR of a particular type of filter, e.g., a filter that removes contaminants of a particular type. This first safety rule may specify actions if the condition is not satisfied such as generating an alert at data hub 14A associated with worker 10A and sending a message to PPEMS 6, which may cause PPEMS 6 to send a notification to remote user 24 (e.g., the safety manager).

PPEMS 6 may select first safety rule (and any other safety rules based on the context data) for work environment 8A and send the programmable safety rules to one or more of the articles of PPE worn by worker 10A and/or data hub 14A that is communicatively coupled to the one or more of the articles of PPE. In this way, contextually specific rules based on the context data of one or more of worker 10A, work environment 8A and PPE worn or assigned to worker 10A may be configured at one or more of data hub 14A and/or PPE worn or assigned to worker 10A. For instance, the programmable safety rules may be configured at the article of PPE or the data hub to perform one or more operations based at least in part on PPE data received from communication components of one or more articles of PPE worn by or assigned to worker 10A. In some examples PPE data may be, but is not limited to context data as described above. In some examples, PPE data may be any data generated by PPE.

In the example of FIG. 1, prior to entering and/or once worker 10A is within work environment 8A, data hub 14A may execute the first safety rule. Data hub 14A may periodically, continuously, or asynchronously execute the first safety rule. Data hub 14A may receive PPE data from the PAPR that indicates the filter type of the filter currently installed within the PAPR. Data hub 14A may determine whether the filter type satisfies the condition of the first safety rule executed at data hub 14A. Because the filter type satisfies the condition, data hub 14A may not execute any corresponding operations associated with the condition of the first safety.

At a later time, worker 10A may relocate to work environment 8B. For instance, worker 10A may relocate within the same day to work environment 8B. Data hub 14A may determine that it is within a threshold distance of entering environment 8B or has entered environment 8B and send a message that includes context data to PPEMS 6 that indicates data hub 14A is within a threshold distance of entering environment 8B. PPEMS 6 may receive the context data and select, based at least in part on the context data, a set of programmable safety rules that are contextually associated with at least one article of PPE worn by or assigned to worker 10A. For instance, PPEMS 6 may receive context data for worker 10A that indicates a unique identifier of worker 10A, a set of identifiers of articles of PPE worn by worker 10A, and an indication of work environment 8B. In the present example, the context data may include a set of one or more characteristics of work environment 8B that PPEMS 6 may use to select one or more safety rules that correspond to or match the one or more characteristics of work environment 8B. Based on the context data, PPEMS 6 may select the second safety rule associated with work environment 8A and described above with a condition that determines if a worker is approaching or has entered work environment 8B, (a) whether a PAPR is being worn by the worker and (b) whether the PAPR includes two filters to remove particulates and organic vapors, respectively. This second safety rule may specify actions if the condition is not satisfied such as generating an alert at data hub 14A associated with worker 10A and sending a message to PPEMS 6, which may cause PPEMS 6 to send a notification to remote user 24 (e.g., the safety manager).

PPEMS 6 may select second safety rule (and any other safety rules based on the context data) for work environment 8B and send the programmable safety rules to one or more of the articles of PPE worn by worker 10A and/or data hub 14A that is communicatively coupled to the one or more of the articles of PPE. In this way, contextually specific rules based on the context data of one or more of worker 10A, work environment 8B and PPE worn or assigned to worker 10A may be configured at one or more of data hub 14A and/or PPE worn or assigned to worker 10A. For instance, the programmable safety rules may be configured at the article of PPE or the data hub to perform one or more operations based at least in part on PPE data received from communication components of one or more articles of PPE worn by or assigned to worker 10A. In some examples PPE data may be, but is not limited to context data as described above. PPE data may be any data generated by an article of PPE.

In the example of FIG. 1, prior to entering and/or once worker 10A is within work environment 8B, data hub 14B may execute the second safety rule. Data hub 14A may receive PPE data from the PAPR that indicates the filter type of the filter currently installed within the PAPR. Data hub 14A may determine whether the filter type satisfies the condition of the second safety rule executed at data hub 14A. Because worker 10A, in the present example, has failed to add a second filter to the PAPR worn by worker 10A and is about to and/or has entered work environment 8B, data hub 14A the condition for the second safety rule has not been satisfied. Because the second safety rule has not been satisfied, data hub 14A may perform the actions associated with the second safety rule including generating an alert at data hub 14A associated with worker 10A and sending a message to PPEMS 6, which may cause PPEMS 6 to send a notification to remote user 24 (e.g., the safety manager). Data hub 14A may generate one or more alerts, such as haptic, visual, audio, or other type of output. The message sent by data hub 14A to PPEMS 6 may include notification data, such as but not limited to: an identifier of the second safety rule; context data for the worker, article of PPE, and/or work environment; date and time information, a severity indicator, or any other information that may be descriptive of the safety rule. PPEMS 6, upon receiving the message may log event (e.g., violation of second safety rule), send a notification to a computing device 18 that corresponds to remote user 24, which is output, e.g., with haptic, visual, audio, or other type of output.

Although the example of FIG. 1 is described with respect to a PAPR as the PPE, any number of programmable safety rules may be applied to any number of different articles of PPE. As such, any number of programmable safety rules may be dynamically configured based on context data determined by the articles of PPE, the data hub, and or PPEMS 6. In the example of FIG. 1, suitable operations may be performed when one or more conditions of safety rules are satisfies. For instance, different types of alerts may be generated based on the context data, PPE data, and/or actions of the safety rule. As an example different alerts may be generated in response to different severity types of alerts. In some examples, the type of alert may be based on characteristics of the work environment. For example, if the worker is operating in a high-noise environment (e.g., noise levels above a particular threshold), the data hub and/or PPE may generate alerts that are not audible but rather haptic, visual, etc. In some examples, not only could the user be alerted to a noise magnitude or other hazard above a certain level, but that the worker may also be approaching their maximum shift dose levels, due to other noise exposure during a time interval. This information could come from wearing a noise dosimeter that communicates with the hub. In some examples, an alert generated based on a condition satisfied at a first worker's data hub or article of PPE may be sent to a second worker's data hub or article of PPE that is within a threshold distance of the first worker's data hub.

Techniques of this disclosure may be applicable in specialized work environments, such as confined spaces. A confined space may require a permit, require a pre-assessment before entering the area, have particularized hazards, may not have stationary beacons, or may have other restrictions that differ from non-confined spaces. Different sets of programmable safety rules may be configured for different confined spaces, which have different safety requirements.

Figure 2:
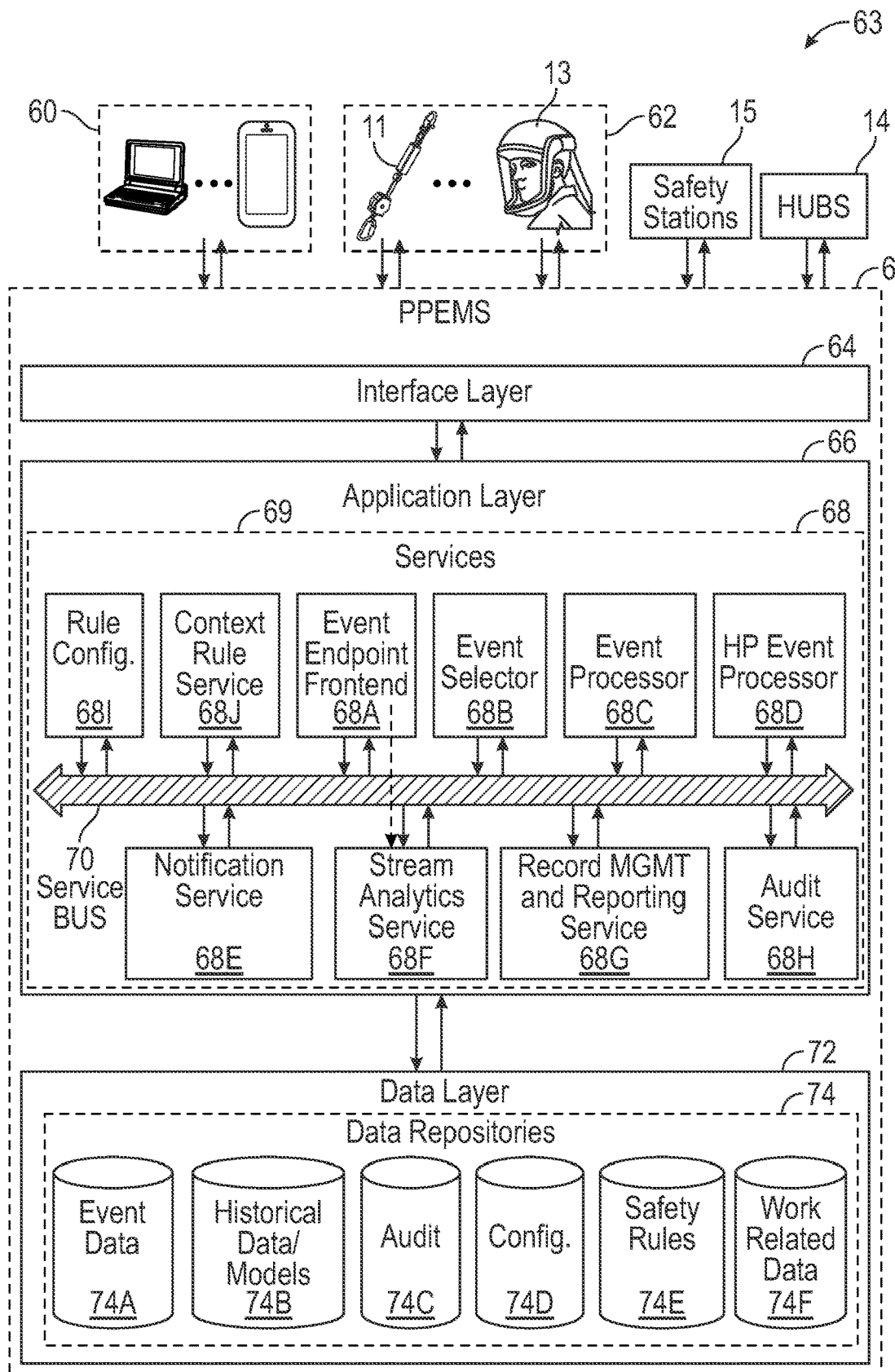
FIG. 2 is a block diagram providing an operating perspective of a PPEMS when hosted as cloud-based platform capable of supporting multiple, distinct work environments having an overall population of workers with a variety of communication enabled personal protection equipment (PPEs), in accordance with techniques of this disclosure.

FIG. 2 is a block diagram providing an operating perspective of PPEMS 6 when hosted as cloud-based platform capable of supporting multiple, distinct work environments 8 having an overall population of workers 10 having a variety of communication enabled personal protection equipment (PPES), such as safety release lines (SRLs) 11, respirators 13, safety helmets or other safety equipment. In the example of FIG. 2, the components of PPEMS 6 are arranged according to multiple logical layers that implement the techniques of the disclosure. Each layer may be implemented by a one or more modules comprised of hardware, software, or a combination of hardware and software.

In FIG. 2, personal protection equipment (PPEs) 62, such as SRLs 11, respirators 13 and/or other equipment, either directly or by way of hubs 14, as well as computing devices 60, operate as clients 63 that communicate with PPEMS 6 via interface layer 64. Computing devices 60 typically execute client software applications, such as desktop applications, mobile application, and web applications. Computing devices 60 may represent any of computing devices 16, 18 of FIG. 1. Examples of computing devices 60 may include, but are not limited to: a portable or mobile computing device (e.g., smartphone, wearable computing device, tablet), laptop computers, desktop computers, smart television platforms, and servers, to name only a few examples.

As further described in this disclosure, PPEs 62 communicate with PPEMS 6 (directly or via hubs 14) to provide streams of data acquired from embedded sensors and other monitoring circuitry and receive from PPEMS 6 alerts, configuration and other communications. Client applications executing on computing devices 60 may communicate with PPEMS 6 to send and receive information that is retrieved, stored, generated, and/or otherwise processed by services 68. For instance, the client applications may request and edit safety event information including analytical data stored at and/or managed by PPEMS 6. In some examples, client applications 61 may request and display aggregate safety event information that summarizes or otherwise aggregates numerous individual instances of safety events and corresponding data acquired from PPEs 62 and or generated by PPEMS 6. The client applications may interact with PPEMS 6 to query for analytics information about past and predicted safety events, behavior trends of workers 10, to name only a few examples. In some examples, the client applications may output for display information received from PPEMS 6 to visualize such information for users of clients 63. As further illustrated and described in below, PPEMS 6 may provide information to the client applications, which the client applications output for display in user interfaces.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, client application 61 may be a mobile application compiled to run on a mobile operating system, such as Google Android, Apple iOS, Microsoft Windows Mobile, or BlackBerry OS to name only a few examples. As another example, a client applications may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 2, PPEMS 6 also includes an application layer 66 that represents a collection of services for implementing much of the underlying operations of PPEMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents a logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanism. In still other examples, a pipeline system architecture could be used to enforce a workflow and logical processing of data a messages as they are process by the software system services. Before describing the functionality of each of services 68, the layers is briefly described herein.

Data layer 72 of PPEMS 6 represents a data repository that provides persistence for information in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system. Data repositories 74A-74D are further described herein.

As shown in FIG. 2, each of services 68A-68H ("services 68") are implemented in a modular form within PPEMS 6. Although shown as separately modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications 61 may call one or more interfaces of one or more of services 68 to perform techniques of this disclosure.

In accordance with techniques of the disclosure, services 68 may include an event processing platform including an event endpoint frontend 68A, event selector 68B, event processor 68C and high priority (HP) event processor 68D. Event endpoint frontend 68A operates as a front end interface for receiving and sending communications to PPEs 62 and hubs 14. In other words, event endpoint frontend 68A may operate as a front line interface to safety equipment deployed within environments 8 and utilized by workers 10. In some instances, event endpoint frontend 68A may receive numerous event streams 69 of communications from the PPEs 62 carrying data sensed and captured by the safety equipment. Each incoming communication may, for example, carry data recently capture representing sensed conditions, motions, temperatures, actions or other data, generally referred to as events. Communications exchanged between the event endpoint frontend 68A and the PPEs may be real-time or pseudo real-time depending on communication delays and continuity.

Event selector 68B operates on the stream of events 69 received from PPEs 62 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D.

In general, event processor 68C or high priority (HP) event processor 68D operate on the incoming streams of events to update event data 74A within data repositories 74. For instance, event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

In addition, event selector 68B directs the incoming stream of events to stream analytics service 68F, which is configured to process the incoming stream of events to perform real-time analytics. Stream analytics service 68F may, for example, be configured to process and compare multiple streams of event data with historical values and models 74B in real-time as event data is received. In this way, stream analytic service 68D may be configured to detect anomalies, transform incoming event data values, trigger alerts upon detecting safety concerns based on conditions or worker behaviors. Historical values and models 74B may include, for example, specified safety rules, business rules and the like. In addition, stream analytic service 68D may generate output for communicating to PPPEs 62 by notification service 68F or computing devices 60 by way of record management and reporting service 68D.

Analytics service 68F processes inbound streams of events, potentially hundreds or thousands of streams of events, from enabled safety PEP 62 utilized by workers 10 within environments 8 to apply historical data and models 74B to compute assertions, such as identified anomalies or predicted occurrences of imminent safety events based on conditions or behavior patterns of the workers. Analytics service 68D may publish the assertions to notification service 68F and/or record management by service bus 70 for output to any of clients 63. In this way, analytics service 68F may configured as an active safety management system that predicts imminent safety concerns and provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply historical data and models 74B to determine for a particular work, the likelihood that a safety event is imminent for the worker based on detected behavior or activity patterns, environmental conditions and geographic locations. In some examples, analytics service 68F may determine whether a worker is currently impaired, e.g., due to possible alcohol or drugs, and may require intervention to prevent safety events. As yet another example, analytics service 68F may provide comparative ratings of workers or type of safety equipment in a particular environment 8.

Analytics service 68F may maintain or otherwise use one or more models that provide risk metrics to predict patient outcomes. Analytics service 68F may also generate order sets, recommendations, and quality measures. In some examples, analytics service 68F may generate user interfaces based on processing information stored by PPEMS 6 to provide actionable information to any of clients 63.

Although other technologies can be used, in one example implementation, analytics service 68F utilizes machine learning when operating on streams of safety events so as to perform real-time analytics. That is, analytics service 68F includes executable code generated by application of machine learning to training data of event streams and known safety events to detect patterns. The executable code may take the form of software instructions or rule sets and is generally referred to as a model that can subsequently be applied to event streams 69 for detecting similar patterns and predicting upcoming events. Alternatively, or in addition, analytics may communicate all or portions of the generated code and/or the machine learning models to hubs 16 for execution thereon so as to provide local alerting in near-real time to PPEs. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, individual or groups/types of PPEs 62. In response, record management and reporting service 68G accesses event information based on the request. Upon retrieving the event data, record management and reporting service 68G constructs an output response to the client application that initially requested the information. In some examples, the data may be included in a document, such as an HTML document, or the data may be encoded in a JSON format or presented by a dashboard application executing on the requesting client computing device. For instance, as further described in this disclosure, example user interfaces that include the event information are depicted in the figures.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the patient information over the period of time.

In example implementations, services 68 may also include security service 68E that authenticate and authorize users and requests with PPEMS 6. Specifically, security service 68E may receive authentication requests from client applications and/or other services 68 to access data in data layer 72 and/or perform processing in application layer 66. An authentication request may include credentials, such as a username and password. Security service 68E may query security data 74A to determine whether the username and password combination is valid. Configuration data 74D may include security data in the form of authorization credentials, policies, and any other information for controlling access to PPEMS 6. As described above, security data 74A may include authorization credentials, such as combinations of valid usernames and passwords for authorized users of PPEMS 6. Other credentials may include device identifiers or device profiles that are allowed to access PPEMS 6.

Services 68 may also include an audit service 68I that provides audit and logging functionality for operations performed at PPEMS 6. For instance, audit services 68I may log operations performed by services 68 and/or data accessed by services 68 in data layer 72. Audit services 68I may store audit information such as logged operations, accessed data, and rule processing results in audit data 74C. In some examples, audit service 68I may generate events in response to one or more rules being satisfied. Audit service 68I may store data indicating the events in audit data 74C.

In the example of FIG. 2, a safety manager may initially configure one or more safety rules, such as described in FIG. 1. As such, remote user 24 may provide one or more user inputs at computing device 18 that configure sets of safety rules for work environment 8A and 8B, respectively. For instance, a computing device 60 of the safety manager may send a message that defines or specifies the safety rules. Such message may include data to select or create conditions and actions of the safety rules.

PPEMS 6 may receive the message from putting device 60 at interface layer 64 which forwards the message to rule configuration component 68I. Rule configuration component 68I may be combination of hardware and/or software that provides for rule configuration including, but not limited to: providing a user interface to specify conditions and actions of rules, receive, organize, store, and update rules included in safety rules 74E. Safety rules data store 74E may be a data store that includes data representing one or more safety rules. When rule configuration component 68I receives data defining safety rules from computing device 60 of the safety manager, rule configuration component 68I may store the safety rules in safety rules data store 75E. In some examples, storing the safety rules may include associating a safety rule with context data, such that rule configuration component 68I may perform a lookup to select safety rules associated with matching context data.

In the example of FIG. 2, worker 10A may be equipped with a PAPR and data hub 14A. The PAPR may include a filter to remove particulates but not organic vapors. Data hub 14A may be initially configured with and store a unique identifier of worker 10A. When initially assigning the PAPR and data hub to worker 10A, a computing device operated by worker 10A and/or a safety manager may cause RMRS 68G to store a mapping in work relation data 74F. Work relation data 74F may include mappings between data that corresponds to PPE, workers, and work environments. Work relation data 74F may be any suitable datastore for storing, retrieving, updating and deleting data. The mapping stored by RMRS 69G may be between the unique identifier of worker 10A and a unique device identifier of data hub 14A. Work relation data store 74F may also map a worker to an environment.

Worker 10A may initially put on the PAPR and data hub 14A prior to entering environment 8A. As worker 10A approaches environment 8A and/or has entered environment 8A, data hub 14A may determine that worker 10A is within a threshold distance of entering environment 8A or has entered environment 8A. Data hub 14A may determine that it is within a threshold distance of entering environment 8A or has entered environment 8A and send a message that includes context data to PPEMS 6 that indicates data hub 14A is within a threshold distance of entering environment 8A.

PPEMS 6 may receive the message at interface layer 64 and forward the message to context rules service 68J. Context rules service 68J may receive messages with context data and select safety rules from safety rules 74E based on the context data. Context rules service 68J may determine that data hub 14A is within a threshold distance of entering environment 8A or has entered environment 8A based on context data received from data hub 14A.

Context rules service 68J may receive the context data and select, based at least in part on the context data, a set of programmable safety rules from safety rules 74E that are contextually associated with at least one article of PPE worn by or assigned to worker 10A, the work environment 8A, and/or worker 10A. For instance, context rules service 68J may receive context data for worker 10A that indicates a unique identifier of worker 10A, a set of identifiers of articles of PPE worn by worker 10A, and an indication of work environment 8A Based on the context data, context rules service 68J may select a first safety rule associated with work environment 8A and described in FIG. 1 with a condition that determines if a worker is approaching or has entered work environment 8A, (a) whether a PAPR is being worn by the worker and (b) whether the filter in the PAPR of a particular type of filter, e.g., a filter that removes contaminants of a particular type. This first safety rule may specify actions if the condition is not satisfied such as generating an alert at data hub 14A associated with worker 10A and sending a message to PPEMS 6, which may cause PPEMS 6 to send a notification to remote user 24 (e.g., the safety manager).

Context rules service 68J may select the first safety rule (and any other safety rules based on the context data) from safety rules 74E for work environment 8A and send the programmable safety rules via interface layer 64 to one or more of the articles of PPE worn by worker 10A and/or data hub 14A that is communicatively coupled to the one or more of the articles of PPE. The first safety rule is then configured at the article of PPE or the data hub 14A to perform one or more operations based at least in part on PPE data received from communication components of one or more articles of PPE worn by or assigned to worker 10A.

When worker 10A relocates to work environment 8B, data hub 14A may determine that it is within a threshold distance of entering environment 8B or has entered environment 8B and send a message that includes context data to PPEMS 6 that indicates data hub 14A is within a threshold distance of entering environment 8B. Context rules service 68J may receive the context data via interface layer 64 and select, based at least in part on the context data, a set of programmable safety rules. For instance, context rules service 68J may receive context data for worker 10A that indicates a unique identifier of worker 10A, a set of identifiers of articles of PPE worn by worker 10A, and an indication of work environment 8B. In the present example, the context data may include a set of one or more characteristics of work environment 8B that context rules service 68J may use to select one or more safety rules that correspond to or match the one or more characteristics of work environment 8B. Based on the context data, context rules service 68J may select the second safety rule associated with work environment 8A from safety rules 74E and described above with a condition that determines if a worker is approaching or has entered work environment 8B, (a) whether a PAPR is being worn by the worker and (b) whether the PAPR includes two filters to remove particulates and organic vapors, respectively. This second safety rule may specify actions if the condition is not satisfied such as generating an alert at data hub 14A associated with worker 10A and sending a message to PPEMS 6, which may cause notification service 68E to send a notification to the safety manager for worker 10A and/or the corresponding work environment.

Context rules service 68J may select second safety rule (and any other safety rules based on the context data) for work environment 8B and send the programmable safety rules to one or more of the articles of PPE worn by worker 10A and/or data hub 14A that is communicatively coupled to the one or more of the articles of PPE. In this way, contextually specific rules based on the context data of one or more of worker 10A, work environment 8B and PPE worn or assigned to worker 10A may be configured at one or more of data hub 14A and/or PPE worn or assigned to worker 10A.

Prior to entering and/or once worker 10A is within work environment 8B, data hub 14B may execute the first safety rule. Data hub 14A may receive PPE data from the PAPR that indicates the filter type of the filter currently installed within the PAPR. Data hub 14A may determine whether the filter type satisfies the condition of the first safety rule executed at data hub 14A. Because worker 10A, in the present example, has failed to add a second filter to the PAPR worn by worker 10A and is about to and/or has entered work environment 8B, data hub 14A the condition for the second safety rule has not been satisfied. Because the second safety rule has not been satisfied, by data hub 14A may perform the actions associated with the second safety rule including generating an alert at data hub 14A associated with worker 10A and sending a message to PPEMS 6, which may cause notification service 68E to send a notification to remote user 24 (e.g., the safety manager). Data hub 14A may generate one or more alerts, such as haptic, visual, audio, or other type of output. The message sent by data hub 14A to PPEMS 6 may include notification data, such as but not limited to: an identifier of the second safety rule; context data for the worker, article of PPE, and/or work environment; date and time information, a severity indicator, or any other information that may be descriptive of the safety rule. Notification service 68E, upon receiving the message may log event (e.g., violation of second safety rule), send a notification to a computing device that corresponds to the safety manager, which is output, e.g., with haptic, visual, audio, or other type of output.

In some examples, PPEMS receives a first message from at least one of the data hub or the article of PPE that indicates the article of PPE satisfies at least one of the set of programmable safety rules. Stream analytics service 68F may determine an anomaly, based at least in part the first message and a plurality of previously received messages (stored in historical data/models 74B) for at least one of the article of PPE, the work environment for the article of PPE, or the worker assigned to the article of PPE. In response to determining the anomaly, stream analytics service 68F may sends a second message to the data hub or the article of PPE that changes the operation of the article of PPE.

Figure 3:
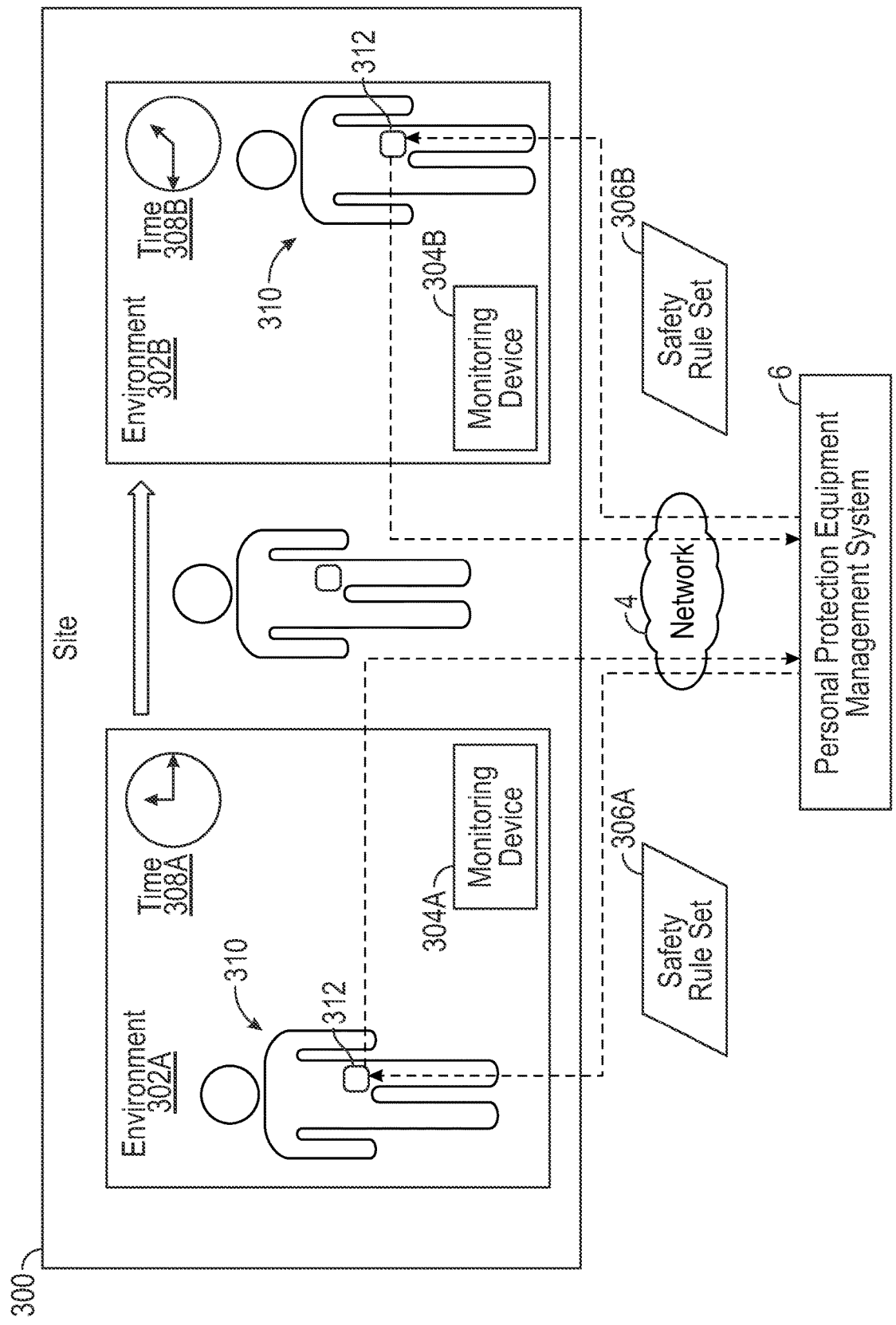
FIG. 3 is a block diagram illustrating an example of configuring different programmable safety rules based on a worker moving from one work environment to another in accordance with techniques of this disclosure.

FIG. 3 is a block diagram illustrating an example of configuring different programmable safety rules based on a worker moving from one work environment to another in accordance with techniques of this disclosure. As shown in FIG. 3, worksite 300 may include different work environments 302A and 302B. Work environments 302A-302B ("worksites 302") may be different areas of worksite 300. In some examples, work environments 302A-302B may be separated by physical barriers such as walls, fences, or the like. In other examples, work environments 302 may not be separated by logical barriers (in contrast to physical barriers), such as boundaries, markings, geographic coordinates, and the like.

In FIG. 3, worker 310 may wear one or more articles of PPE. Additionally, worker 310 may wear or otherwise be equipped with data hub 312. Data hub 312 may include the same or similar functionality to data hubs as described in this disclosure. Initially, worker 310 may approach or enter work environment 302A. Work environment 302A may include monitoring device 304A, which indicates a location within or near work environment 302A. In some examples, monitoring device 304A may detect data hub 312 and monitoring device 304A may send a message to PPEMS 6 that indicates worker 310 (and/or data hub 312 is in proximity to work environment 302A. In other examples, data hub 312 may detect monitoring device 304A and send an identifier of device 304A and/or a location of device 304A (and/or data hub 312) to PPEMS 6. In this way, PPEMS 6 may determine that worker 310 is about to enter or has entered work environment 302A.

PPEMS 6, upon determining that worker 310 is about to enter or has entered work environment 302A may select safety rule set 306A based on context data, as described in this disclosure. In some examples, PPEMS 6 may request context data from one or more of monitoring device 304A, data hub 312, and/or any other computing devices that can provide context data for PPE of worker 310, work environment 302A and worker 302A. In other examples, one or more of monitoring device 304A, data hub 312, and/or any other computing devices may send context data for PPE of worker 310, work environment 302A and worker 302A to PPEMS 6. PPEMS 6 may select safety rule set 306A which includes one or more programmable safety rules and sends safety rule set 306A to data hub 312. In other examples, PPE of worker 310 may receive safety rule set 306A directly.

In FIG. 3, data hub 312 receives safety rule set 306A and configures data hub 312 (and/or PPE of worker 310) according to the safety rules. As worker 310 operates within or proximate to work environment 302A, data hub 312 (and/or PPE of worker 310) may process PPE data generated by data hub 312 and/or PPE of worker 310. Based on whether one or more of the safety rules are satisfied or not satisfied, data hub 312 and/or PPE of worker 310 may perform one or more operations defined by the safety rules, such as generating alerts for worker 310, sending messages to PPEMS 6, altering the operation of PPE of worker 310, to name only a few examples. For instance, a message that alerts operation of PPE may include modifying a speed of a PAPR blower based on a calculated concentration of particulates in the air and the lifetime of a filter. Such a modification of the operation of the PAPR blower speed may extend the lifetime of the filter. In another example, a message may change the change for wireless communication in an ear-muff style hearing protector. Such messages that modify the operation of PPE may modify any electronically controllable function of an article of PPE.

After worker 310 has completed work in environment 302A, worker 310 may move to worker environment 302B at time 308B. PPEMS 6, upon determining that worker 310 is about to enter or has entered work environment 302B may select safety rule set 306B based on context data, as described in this disclosure. One or more of monitoring device 304A, data hub 312, and/or any other computing devices may send context data for PPE of worker 310, work environment 302A and worker 302A to PPEMS 6. PPEMS 6 may select safety rule set 306B which includes one or more programmable safety rules and sends safety rule set 306B to data hub 312.

Data hub 312 receives safety rule set 306B and configures data hub 312 (and/or PPE of worker 310) according to the safety rules. In the example of FIG. 3, data hub 312 may no longer execute safety rule set 306A. In some examples, safety rule set 306B may replace rule set 306A. In some examples, safety rule set 306A may be remoted from data hub 312. As worker 310 operates within or proximate to work environment 302B, data hub 312 (and/or PPE of worker 310) may process PPE data generated by data hub 312 and/or PPE of worker 310. Based on whether one or more of the safety rules are satisfied or not satisfied, data hub 312 and/or PPE of worker 310 may perform one or more operations defined by the safety rules, such as generating alerts for worker 310, sending messages to PPEMS 6, altering the operation of PPE of worker 310, to name only a few examples.

Figure 4:
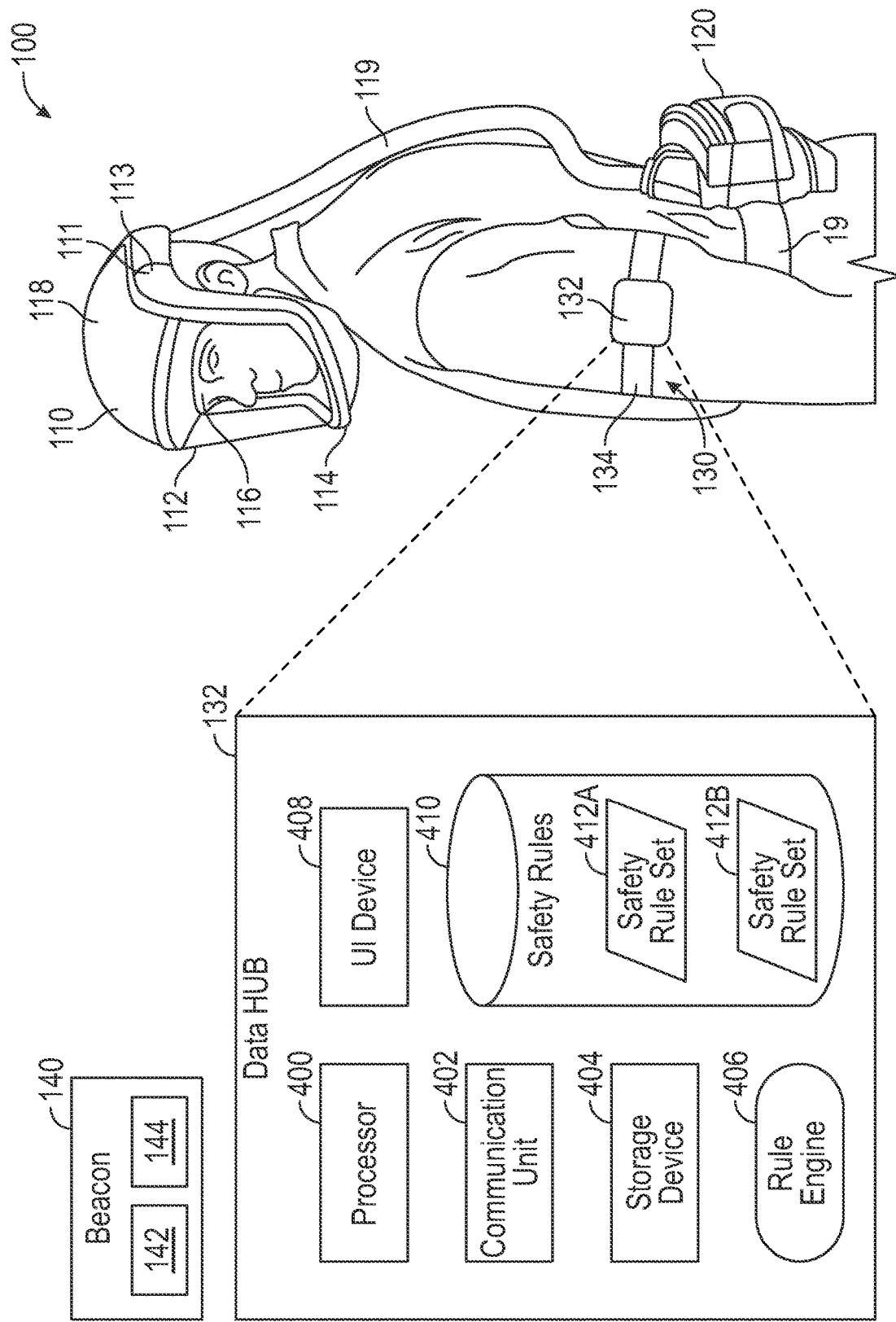
FIG. 4 is a conceptual diagram of a data hub configurable to execute programmable safety rules based on contextual data in accordance with one or more techniques of this disclosure.

FIG. 4 is a conceptual diagram of a data hub configurable to execute programmable safety rules based on contextual data in accordance with one or more techniques of this disclosure. As shown in FIG. 4, a worker is wearing supplied air respirator system 100. System 100 includes head top 110, clean air supply source 120, and data hub 130. Head top 110 is connected to clean air supply source 120 by hose 119. Clean air supply source 120 can be any type of air supply source, such as a blower assembly for a powered air purifying respirator (PAPR), an air tank for a self-contained breathing apparatus (SCBA) or any other device that provides air to head top 110. In FIG. 4, clean air supply source 120 is a blower assembly for a PAPR. A PAPR is commonly used by individuals working in areas where there is known to be, or there is a potential of there being dusts, fumes or gases that are potentially harmful or hazardous to health. A PAPR typically includes blower assembly, including a fan driven by an electric motor for delivering a forced flow of air to the respirator user. The air is passed from the PAPR blower assembly through hose 119 to the interior of head top 110.

Head top 110 includes a visor 112 that is sized to fit over at least a user's nose and mouth. Visor 112 includes lens 116 which is secured to helmet 118 by the frame assembly 114. Head top also includes a position sensor 111 that senses the position of visor 112 relative to helmet 118 to determine if the visor is in an open position or in a closed position. In some instances, position sensor 111 may detect whether visor 112 is partially open, and if so, what measure (e.g., percent or degree) it is open. As an example, the position sensor 110 may be a gyroscope that computes angular yaw, pitch, and/or roll (in degrees or radians) of the visor 112 relative to the helmet 118. In another example, the position sensor 110 may be a magnet. A percent may be estimated respecting how open a visor 112 is in relation to the helmet 118 by determining the magnetic field strength or flux perceived by the position sensor 110. "Partially open" visor information can be used to denote that the user may be receiving eye and face protection for hazards while still receiving a reasonable amount of respiratory protection. This "partially open" visor state, if kept to short durations, can assist the user in face to face communications with other workers. Position sensor 111 can be a variety of types of sensors, for example, an accelerometer, gyro, magnet, switch, potentiometer, digital positioning sensor or air pressure sensor. Position sensor 111 can also be a combination of any of the sensors listed above, or any other types of sensors that can be used to detected the position of the visor 112 relative to the helmet 118.

Head top 110 may include other types of sensors. For example, head top 110 may include temperature sensor 113 that detects the ambient temperature in the interior of head top 110. Head top 110 may include other sensors such as an infrared head detection sensor positioned near the suspension of head top 110 to detect the presence of a head in head top 110, or in other words, to detect whether head top 110 is being worn at any given point in time. Head top 110 may also include other electronic components, such as a communication module, a power source, such as a battery, and a processing component. A communication module may include a variety of communication capabilities, such as radio frequency identification (RFID), Bluetooth, including any generations of Bluetooth, such as Bluetooth low energy (BLE), any type of wireless communication, such as WiFi, Zigbee, radio frequency or other types of communication methods as will be apparent to one of skill in the art up one reading the present disclosure.

Communication module in head top 110 can electronically interface with sensors, such as position sensor 111 or temperature sensor 113, such that it can transmit information from position sensor 111 or temperature sensor 113 to other electronic devices, including data hub 130.

FIG. 4 illustrates components of data hub 132 including processor 400, communication unit 402, storage device 404, rule engine 406, user-interface device 408, and safety rules 410, which may include safety rule sets 412A and 412B. FIG. 4 illustrates only one particular example of data hub 132, as shown in FIG. 4. Many other examples of data hub 132 may be used in other instances and may include a subset of the components included in example data hub 132 or may include additional components not shown example data hub 132 in FIG. 4. In some examples, data hub 132 may be an intrinsically safe computing device, smartphone, wrist- or head-worn computing device, or any other computing device that may include a set, subset, or superset of functionality or components as shown in data hub 132. Communication channels may interconnect each of the components in data hub 132 for inter-component communications (physically, communicatively, and/or operatively). In some examples, communication channels may include a hardware bus, a network connection, one or more inter-process communication data structures, or any other components for communicating data between hardware and/or software.

One or more processors 400 may implement functionality and/or execute instructions within data hub 132. For example, processor 400 may receive and execute instructions stored by storage devices 404. These instructions executed by processor 400 may cause data hub 132 to store and/or modify information, within storage devices 404 during program execution. Processors 400 may execute instructions of components, such as rule engine 406 to perform one or more operations in accordance with techniques of this disclosure. That is, rule engine 406 may be operable by processor 400 to perform various functions described herein.

Data hub 132 may include one or more user-interface devices 408 to receive user input and/or output information to a user. One or more input components of user-interface devices 408 may receive input. Examples of input are tactile, audio, kinetic, and optical input, to name only a few examples. User-interface devices 408 of data hub 132, in one example, include a mouse, keyboard, voice responsive system, video camera, buttons, control pad, microphone or any other type of device for detecting input from a human or machine. In some examples, UI device 408 may be a presence-sensitive input component, which may include a presence-sensitive screen, touch-sensitive screen, etc.

One or more output components of user-interface devices 408 may generate output. Examples of output are tactile, audio, and video output. Output components of user-interface devices 408, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components may be integrated with data hub 132 in some examples.

UI device 408 may include a display, lights, buttons, keys (such as arrow or other indicator keys), and may be able to provide alerts to the user in a variety of ways, such as by sounding an alarm or vibrating. The user interface can be used for a variety of functions. For example, a user may be able to acknowledge or snooze an alert through the user interface. The user interface may also be used to control settings for the head top and/or turbo peripherals that are not immediately within the reach of the user. For example, the turbo may be worn on the lower back where the wearer cannot access the controls without significant difficulty.

One or more communication units 402 of data hub 132 may communicate with external devices by transmitting and/or receiving data. For example, data hub 132 may use communication units 402 to transmit and/or receive radio signals on a radio network such as a cellular radio network. In some examples, communication units 402 may transmit and/or receive satellite signals on a satellite network such as a Global Positioning System (GPS) network. Examples of communication units 402 include a network interface card (e.g. such as an Ethernet card), an optical transceiver, a radio frequency transceiver, a GPS receiver, or any other type of device that can send and/or receive information. Other examples of communication units 402 may include Bluetooth®, GPS, 3G, 4G, and Wi-Fi® radios found in mobile devices as well as Universal Serial Bus (USB) controllers and the like.

One or more storage devices 404 within data hub 132 may store information for processing during operation of data hub 132. In some examples, storage device 404 is a temporary memory, meaning that a primary purpose of storage device 404 is not long-term storage. Storage device 404 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage device 404, in some examples, also include one or more computer-readable storage media. Storage device 404 may be configured to store larger amounts of information than volatile memory. Storage device 404 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage device 404 may store program instructions and/or data associated with components such as rule engine 406.

Data hub 132 may also include a power source, such as a battery, to provide power to components shown in data hub 132. A rechargeable battery, such as a Lithium Ion battery, can provide a compact and long-life source of power. Data hub 132 may be adapted to have electrical contacts exposed or accessible from the exterior of the hub to allow recharging the data hub 132.

Data hub 132 may store safety rules 410 as described in this disclosure. Safety rules 410 may be stored in any suitable data store as described in this disclosure. Safety rules may include threshold information both for a length of time visor 112 is allowed to be in an open position before an alert is generated, and the level or type of contaminants that will trigger an alert. For example, when data hub 130 receives information from an environmental beacon that there are no hazards present in the environment, the threshold for the visor 112 being in the open position may be infinite. If a hazard is present in the environment, then the threshold may be determined based upon the concern of the threat to the user. Radiation, dangerous gases, or toxic fumes would all require assignment of the threshold to be on the order of one second or less. Thresholds for head top temperature can be used to predict heat related illness and more frequent hydration and/or rest periods can be recommended to the user. Thresholds can be used for predicted battery run time. As the battery nears selectable remaining run time, the user can be notified/warned to complete their current task and seek a fresh battery. When a threshold is exceed for a specific environmental hazard, an urgent alert can be given to the user to evacuate the immediate area. Thresholds can be customized to various levels of openness for the visor. In other words, a threshold for the amount of a time the visor may be open without triggering an alarm may be longer if the visor is in the partially open position as compared to the open position.

Reaching different thresholds may result in triggering different types of alerts or alarms. For example, alarms may be informational (not requiring a user response), urgent (repeated and requiring a response or acknowledgement from a user), or emergency (requiring immediate action from a user.) The type of alert or alarm can be tailored to the environment. Different types of alerts and alarms can be coupled together to get user attention. In some instances, a user may be able to "snooze" an alert or alarm.

Data hub 132 may be portable such that it can be carried or worn by a user. Data hub 132 can also be personal, such that it is used by an individual and communicates with personal protective equipment (PPE) assigned to that individual. In FIG. 1, data hub 132 is secured to a user using a strap 134. However, data hub may be carried by a user or secured to a user in other ways, such as being secured to PPE being worn by the user, to other garments being worn to a user, being attached to a belt, band, buckle, clip or other attachment mechanism as will be apparent to one of skill in the art upon reading the present disclosure.

Environmental beacon 140 includes at least environmental sensor 142 which detects the presence of a hazard and communication module 144. Environmental sensor 142 may detect a variety of types of information about the area surrounding environmental beacon 140. For example, environmental sensor 142 may be a thermometer detecting temperature, a barometer detecting pressure, an accelerometer detecting movement or change in position, an air contaminant sensor for detecting potential harmful gases like carbon monoxide, or for detecting air-born contaminants or particulates such as smoke, soot, dust, mold, pesticides, solvents (e.g., isocyanates, ammonia, bleach, etc.), and volatile organic compounds (e.g., acetone, glycol ethers, benzene, methylene chloride, etc.). Environmental sensor 142 may detect, for example any common gasses detected by a four gas sensor, including: CO, O2, HS and Low Exposure Limit. In some instances, environmental sensor 142 may determine the presence of a hazard when a contaminant level exceeds a designated hazard threshold. In some instances, the designated hazard threshold is configurable by the user or operator of the system. In some instances, the designated hazard threshold is stored on at least one of the environmental sensor and the personal data hub. In some instances, the designated hazard threshold is stored at PPEMS 6 and can be sent to data hub 132 or environmental beacon 140 and stored locally on data hub 132 or environmental beacon 140.

Environmental beacon 140 and communication module 144 are electronically connected to environmental sensor 142 to receive information from environmental sensor 142. Communication module 144 may include a variety of communication capabilities, such as: RFID, Bluetooth, including any generations of Bluetooth technology, and WiFi communication capabilities. Data hub 132 can also include any type of wireless communication capabilities, such as radio frequency or Zigbee communication.

In some instances, environmental beacon 140 may store hazard information based on the location of environmental beacon 140. For example, if environmental beacon 140 is in an environment known to have physical hazards, such as the potential of flying objects, environmental beacon 140 may store such information and communicate the presence of a hazard based on the location of environmental beacon 140. In other instances, the signal indicating the presence of a hazard may be generated by environmental beacon 140 based on detection of a hazard by environmental sensor 142.

The system may also have an exposure threshold. An exposure threshold can be stored on any combination of PPEMS 6, data hub 130, environmental beacon 140, and head top 110. A designated exposure threshold is the time threshold during which a visor 112 can be in the open position before an alert is generated. In other words, if the visor is in the open position for a period of time exceeding a designated exposure threshold, an alert may be generated. The designated exposure threshold may be configurable by a user or operator of the system. The designated exposure threshold may depend on personal factors related to the individual's health, age, or other demographic information, on the type of environment the user is in, and on the danger of the exposure to the hazard.

An alert can be generated in a variety of scenarios and in a variety of ways. For example, the alert may be generated by the data hub 132 based on information received from head top 110 and environmental sensor 140. An alert may be in the form of an electronic signal transmitted to PPEMS 6 or to any other component of system 100. An alert may comprise one or more of the following types of signals: tactile, vibration, audible, visual, heads-up display or radio frequency signal.

As shown in FIG. 4, data hub 132 may store safety rules 408. In some examples, safety rules 410 may include different safety rule sets, such as safety rule set 412A and 412B, which may correspond to safety rule set 306A and 306B in FIG. 3. Data hub 132 may include rule engine 406. Rule engine 406 may be a combination of hardware and software that executes one or more safety rules based on context data. For instance, data hub 132 may send context data to PPEMS 6 and receive safety rule sets 412A and 412B. Rule engine 132 may determine which safety rules to execute based on the context data, information included in the safety rule set, other information received from PPEMS 6 or other computing devices, user input from the worker, or any other source of data that indicates which safety rules to execute. In some examples, each of safety rules sets 412A and 412B may be installed prior to the worker entering a work environment, while in other examples, safety rule set 412A may be dynamically retrieved by data hub 132 based on context data generated at first particular point in time, and safety rule set 412B may be dynamically retrieved by data hub 132 based on context data generated at a second particular point in time before or after the first particular point in time.

Rule engine 406 may execute safety rules periodically, continuously, or asynchronously. For instance, rule engine 406 may execute safety rules periodically by evaluating the conditions of such rules each time a particular time interval passes or expires (e.g., every second, every minute, etc.). In some examples, rule engine 406 may execute safety rules continuously by checking such conditions using one or more scheduling techniques that continuously evaluate the conditions of such rules. In some examples, rule engine 406 may execute safety rules asynchronously, such as in response to detecting an event. An event may be any detectable occurrence, such as moving to a new location, detecting a worker, coming within a threshold distance of another object, or any other detectable occurrence.

Rule engine 406, upon determining that a condition of a safety rule has or has not been satisfied may perform one or more actions associated with the safety rule by executing one or more operations that define the actions. For instance, rule engine 406 may execute a condition that determines if a worker is approaching or has entered a work environment, (a) whether a PAPR is being worn by the worker and (b) whether the filter in the PAPR of a particular type of filter, e.g., a filter that removes contaminants of a particular type. This safety rule may specify actions if the condition is not satisfied which cause rule engine 406 to generate an alert at data hub 132 using UI device 408 and send a message using communication unit 402 to PPEMS 6, which may cause PPEMS 6 to send a notification to a remote user (e.g., the safety manager).

Figure 5:
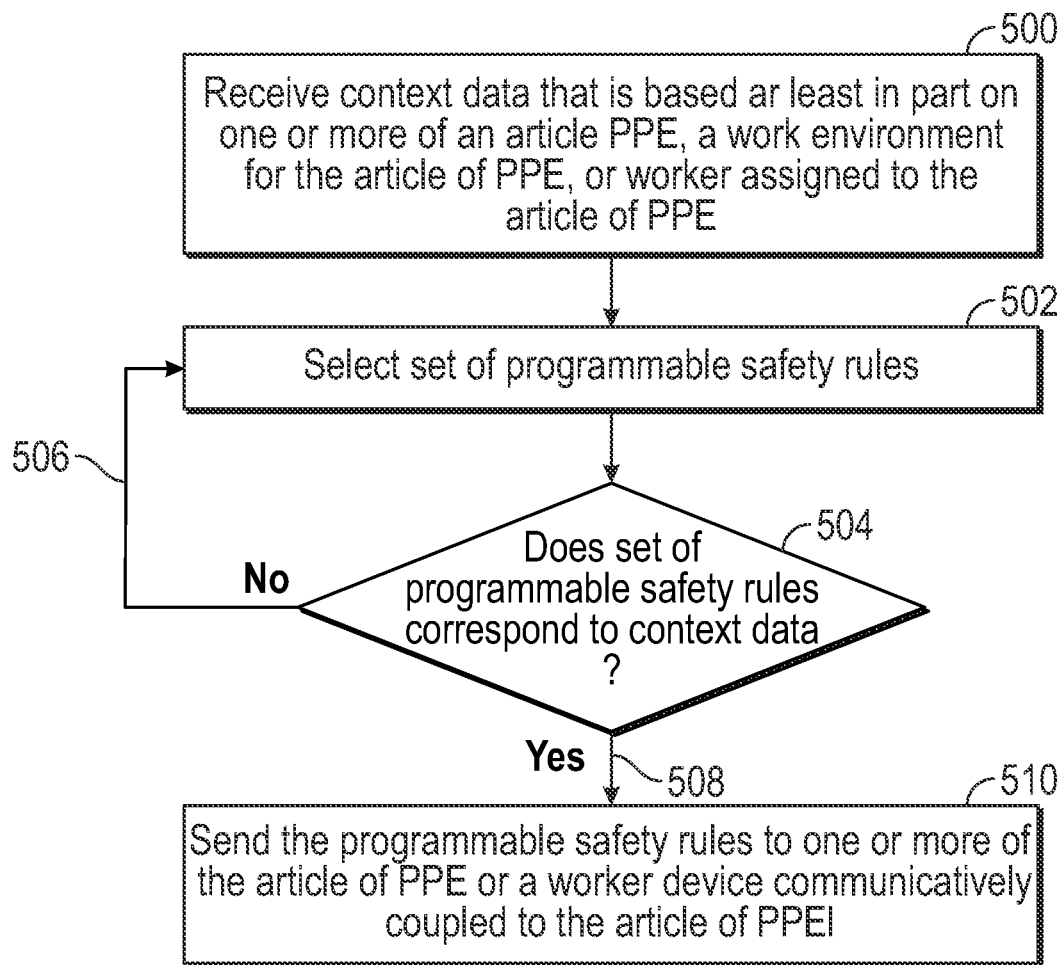
FIG. 5 is a flow diagram illustrating example operations to select programmable safety rules based on contextual data in accordance with one or more techniques of this disclosure.

FIG. 5 is a flow diagram illustrating example operations to select programmable safety rules based on contextual data in accordance with one or more techniques of this disclosure. For purposes of illustration only, the example operations are described below within the context of PPEMS 6 of FIGS. 1 and 2. As shown in FIG. 5, PPEMS 6 may receive context data that is based at least in part on one or more of an article of PPE, a work environment for the article of PPE, or a worker assigned to the article of PPE (500). PPEMS 6 may select a set of programmable safety rules that are contextually associated with the at least one article of PPE (502). PPEMS 6 may determine whether the set of programmable safety rules are contextually associated with the at least one article of PPE based at least in part on the context data (504). If the safety rules are not contextually associated with the at least one article of PPE based at least in part on the context data, PPEMS 6 may select another set of safety rules (506). If the safety rules are contextually associated with the at least one article of PPE based at least in part on the context data (508), PPEMS 6 may send the programmable safety rules to one or more of the article of PPE or a data hub communicatively coupled to the article of PPE (510). In some examples, the programmable safety rules are configured at the article of PPE or the data hub to perform one or more operations based at least in part on PPE data received from the communication component of the article of PPE.

Figure 6:
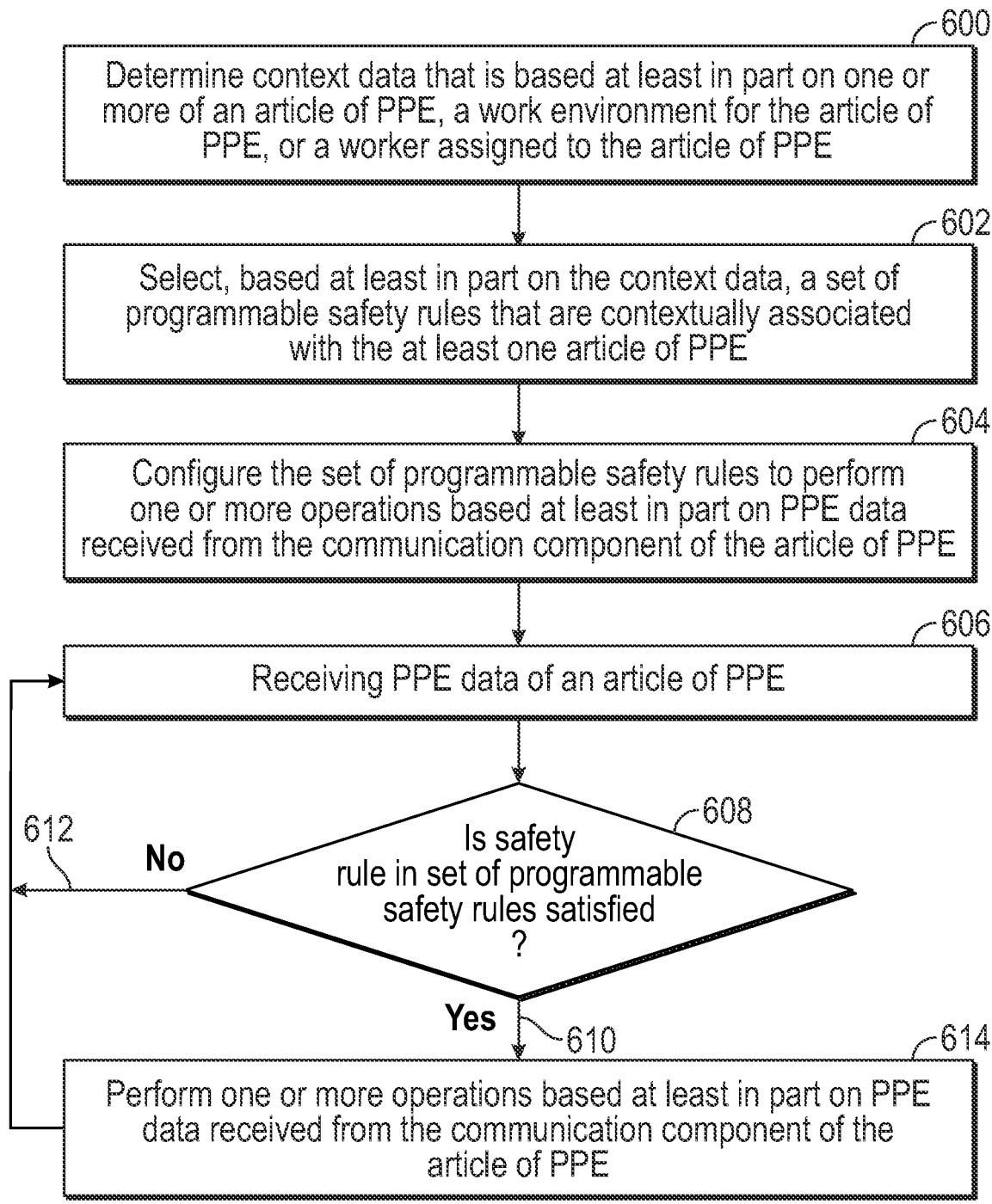
FIG. 6 is a flow diagram illustrating example operations to configure programmable safety rules based on contextual data in accordance with one or more techniques of this disclosure.

FIG. 6 is a flow diagram illustrating example operations to configure programmable safety rules based on contextual data in accordance with one or more techniques of this disclosure. For purposes of illustration only, the example operations are described below within the context of data hub 14A in FIG. 1, although such operations could be performed directly by one or more articles of PPE. Data 14A may determine context data that is based at least in part on one or more of an article of PPE, a work environment for the article of PPE, or a worker assigned to the article of PPE (600). Data hub 14A may select, based at least in part on the context data, a set of programmable safety rules that are contextually associated with the at least one article of PPE (602). In some examples, data hub 14A may communicate with PPEMS 6 to send the context data and receive the set of programmable safety rules as described in this disclosure.

Data hub 14A may configure the set of programmable safety rules to perform one or more operations based at least in part on PPE data received from the communication component of the article of PPE (604). Data hub 14A may receive PPE data of the article of PPE (606). Data hub 14A may determine whether at least one of the set of programmable safety rules has been satisfied (608). If the at least one of the set of programmable safety rules has not been satisfied (612), data hub 14A may continue to evaluate received PPE data (606). If the at least one of the set of programmable safety rules has been satisfied (610), data hub 14A may perform the one or more operations based at least in part on PPE data received from the communication component of the article of PPE (614).

Example 1: A method comprising: receiving, by a computing device, context data that is based at least in part on one or more of an article of PPE, a work environment for the article of PPE, or a worker assigned to the article of PPE; selecting, based at least in part on the context data, a set of programmable safety rules that are contextually associated with the at least one article of PPE; and sending the programmable safety rules to one or more of the article of PPE or a data hub communicatively coupled to the article of PPE, wherein the programmable safety rules are configured at one or more of the article of PPE or the data hub to perform one or more operations based at least in part on PPE data received from the communication component of the article of PPE.

Example 2: The method of Example 1, wherein the set of programmable safety rules are configured at the data hub, wherein the data hub receives the PPE from the communication component of the article of PPE, and wherein the data hub performs the operations in response to determining that the PPE data received from the communication component of the article of PPE satisfies at least one of the set of programmable safety rules.

Example 3: The method of any of Examples 1-2, further comprising: outputting for display an interface to configure the set of programmable safety rules, receiving, from at least one other computing device associated with a safety manager, data that specifies at least a condition and an action that collectively define a safety rule of the set of programmable safety rules, storing the safety rule in the set of programmable safety rules for selection based at least in part on the context data.

Example 4: The method of any of Examples 1-3, further comprising: comparing at least a portion of the context data to at least one condition of a safety rule included in the set of programmable safety rules; and determining that at least the portion of the context data matches the at least one condition of the safety rule.

Example 5: A method comprising: determining, by a computing device, context data that is based at least in part on one or more of an article of PPE, a work environment for the article of PPE, or a worker assigned to the article of PPE; selecting, based at least in part on the context data, a set of programmable safety rules that are contextually associated with the at least one article of PPE; configuring, by the computing device, the set of programmable safety rules to perform one or more operations based at least in part on PPE data received from the communication component of the article of PPE; and in response to receiving the PPE data of the article of PPE and determining that at least one of the set of programmable safety rules has been satisfied, performing the one or more operations based at least in part on PPE data received from the communication component of the article of PPE.

Example 6. The method of Example 5, wherein the context data is first context data, the set of programmable safety rules is a first set of programmable safety rules, the work environment is a first work environment, and the method comprising: in response to sending the first context data to at least one other computing device at a first time, receiving the first set of programmable safety rules when the worker is within a predefined distance of the work environment; in response to determining second context data, sending the second context data to at least one other computing device at a second time; receiving a second set of programmable safety rules when the worker is within a predefined distance of a second work environment; and in response to receiving PPE data of the article of PPE and determining that at least one of the second set of programmable safety rules has been satisfied, performing the one or more operations based at least in part on PPE data received from the communication component of the article of PPE.

Example 7: The method of any of Examples 5-6, wherein the context data is first context data, the set of programmable safety rules is a first set of programmable safety rules, the work environment is a first work environment, and the method comprising: pre-loading the first set of programmable safety rules and a second set of programmable safety rules at the computing device prior to the computing device at least entering or being within a predefined distance of the first and second work environments, wherein the first and second sets of programmable safety rules respectively correspond to the first work environment and a second work environment; in response to determining the first context data, configuring, by the computing device, the first set of programmable safety rules to perform one or more operations based at least in part on PPE data received from the communication component of the article of PPE; and in response to determining the second context data, configuring, by the computing device, the second set of programmable safety rules to perform one or more operations based at least in part on PPE data received from the communication component of the article of PPE.

Example 8: The method of any of Examples 5-7, wherein determining the second context data occurs in response to the working moving from the first work environment to the second work environment.

Various examples of this disclosure have described an area condition that could be a hazard to a worker based on a currently know, measured, or detected environmental condition or location. Examples include areas where a mask needs to be worn due to respiratory concerns, heat stress based on area temperature, etc. Noise levels could also be a condition, but in any case, just knowing the existence of a hazard or level/intensity of the hazard in the area may not be enough to know if the worker is at risk for noise induced hearing loss, because what the worker was previously exposed to before entering the area may be unknown. In such scenarios a worker wearing, for instance, a noise dosimeter could send noise data to a data hub, and the data hub could make a decision as to whether the worker should be in that area or not. For example, if the area is at 84 dB, and the company wide rule is that hearing protection is needed at 85 dB or more, it would not be viewed that the worker is at risk. But if that worker had 4 hours of previous exposure at higher levels, and then enters the 84 dB area anticipating to work another 4 hours, they could easily exceed 100% dosage and be at risk. (Generally, an average of 85 dB for 8 hours is considered 100% Dose). In this case, with the dosimeter communicating to the hub the existing condition of the worker entering the area, the data hub can more accurately determine whether the at risk worker can be in the designated area, and for how long. In this way, active decision making can include data from measurement devices that calculate dosage that communicate to the hub the existing risk level of the person entering the area. These and other techniques could be applicable for any meter calculating dosage (gas, etc.).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A non-transitory computer-readable storage medium encoded with instructions that, when executed, cause at least one processor of a computing device included in a data hub that is physically separate from an article of PPE and that is configured to be worn by a user to:
   determine context data that is based in part on one or more of an article of PPE, a first work environment for the article of PPE, or a worker assigned to the article of PPE;
   receive information from an environmental beacon regarding a presence of a hazard;
   select, based at least in part on the context data determined by the computing device and the presence of the hazard from the environmental beacon, a set of programmable safety rules that are contextually associated with one or more of the article of PPE, a second work environment for the article of PPE, or the user associated with the article of PPE;
   configure the set of programmable safety rules to perform one or more operations based at least in part on generated data from at least one of a communication component of the article of PPE, or the data hub; and
   in response to selecting the generated data from the at least one of the article of PPE or the data hub and determining that at least one of the set of programmable safety rules has been satisfied, performing the one or more operations based at least in part on the generated data received from the communication component of the article of PPE or the data hub.

2. The non-transitory computer-readable storage medium of claim 1, wherein at least a portion of the context data comprises positional information determined by the computing device.

3. The non-transitory computer-readable storage medium of claim 2, wherein the selecting of the set of programmable safety rules occurs in response to the user moving from the first work environment and to the second work environment that corresponds to the positional information determined by the computing device.

4. The non-transitory computer-readable storage medium of claim 2, wherein determining the positional information occurs by using a global positioning system.

5. The non-transitory computer-readable storage medium of claim 2, wherein determining the positional information comprises detecting one or more data hubs of other workers within a threshold distance.

6. The non-transitory computer-readable storage medium of claim 2, wherein determining the positional information occurs by wirelessly communicating with a beacon position.

7. The non-transitory computer-readable storage medium of claim 1, wherein the hazard is dangerous gases or toxic fumes.

8. The non-transitory computer-readable storage medium of claim 7, wherein a dangerous gas is carbon monoxide.

9. The non-transitory computer-readable storage medium of claim 1, wherein the environmental beacon comprises an environmental sensor configured to an air contaminant sensor for detecting carbon monoxide.

10. The non-transitory computer-readable storage medium of claim 1, wherein the environmental beacon is separate from the data hub.

11. The non-transitory computer-readable storage medium of claim 1, wherein the performing the one or more operations comprise updating firmware to the article of PPE.

12. The non-transitory computer-readable storage medium of claim 1, wherein the context data is first context data, the set of programmable safety rules is a first set of programmable safety rules, and the non-transitory computer-readable storage medium is further configured to cause at least one processor of a computing device to:
   in response to sending the first context data to at least one other computing device at a first time, receive the first set of programmable safety rules when the user is within a predefined distance of the first work environment;
   in response to sending second context data to the at least one other computing device at a second time, receive a second set of programmable safety rules when the user is within a predefined distance of a second work environment; and in response to receive the generated data of the article of PPE and determine that at least one of the second set of programmable safety rules has been satisfied, perform the one or more operations based at least in part on generated data received from the communication component of the article of PPE.

13. The non-transitory computer-readable storage medium of claim 1, wherein the context data is first context data, the set of programmable safety rules is a first set of programmable safety rules, and the non-transitory computer-readable storage medium is further configured to cause at least one processor of a computing device to:

pre-load the first set of programmable safety rules and a second set of programmable safety rules at the computing device prior to the computing device at least entering or being within a predefined distance of at least one of the first or second work environments, wherein the first and second sets of programmable safety rules respectively correspond to the first work environment and the second work environment;

in response to determining the first context data, configuring, by the computing device, the first set of programmable safety rules to perform one or more operations based at least in part on generated data received from the communication component of the article of PPE; and in response to determining the second context data, configure, by the computing device, the second set of programmable safety rules to perform one or more operations based at least in part on generated data received from the communication component of the article of PPE.

14. The non-transitory computer-readable storage medium of claim 1, wherein determining the context data occurs in response to the user moving from the first work environment to the second work environment.

15. The non-transitory computer-readable storage medium of claim 1, wherein the positional information comprises at least one of: a position of at least one of the data hub or the article of PPE within a work environment, a geographic location of at least one of the data hub or the article of PPE, an identifier of a beacon within at least one of the first or second work environments, or a location of the beacon within at least one of the first or second work environments.

16. The non-transitory computer-readable storage medium of claim 1, wherein performing the one or more operations comprises generating an alert at the data hub.

17. The non-transitory computer-readable storage medium of claim 1, wherein performing the one or more operations comprises sending a message using communication unit to a personal protection equipment management system, wherein the personal protection equipment management system sends a notification to a remote user.

18. The non-transitory computer-readable storage medium of claim 1, wherein performing the one or more operations comprises altering an operation of the article of PPE of the user.

19. The non-transitory computer-readable storage medium of claim 18, wherein the altering the operation of PPE comprises modifying any electronically controllable function of the article of PPE.

* * * * *